(12) United States Patent
Uchiyama et al.

(10) Patent No.: US 6,902,386 B2
(45) Date of Patent: Jun. 7, 2005

(54) ELECTRIC INJECTION MOLDING MACHINE

(75) Inventors: Tatsuhiro Uchiyama, Gotenba (JP); Shingo Komiya, Tsuru (JP); Motohiro Nagaya, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 210 days.

(21) Appl. No.: 10/441,196

(22) Filed: May 20, 2003

(65) Prior Publication Data

US 2004/0005378 A1 Jan. 8, 2004

(30) Foreign Application Priority Data

Jul. 5, 2002 (JP) ........................................ 2002-197220

(51) Int. Cl.[7] .............................................. B29C 45/77
(52) U.S. Cl. ........................ 425/139; 425/145; 425/150
(58) Field of Search ................................ 425/139, 145, 425/150

(56) References Cited

U.S. PATENT DOCUMENTS 6,179,600 B1 * 1/2001 Siegrist et al. .............. 425/145

FOREIGN PATENT DOCUMENTS

| DE | 1297924 | 6/1969 |
| EP | 1132790 A1 | 9/2001 |
| JP | 4-369520 | 12/1992 |
| JP | 2001-047480 | 8/1999 |
| JP | 2001-239564 | 3/2000 |

* cited by examiner

*Primary Examiner*—Tim Heitbrink
(74) *Attorney, Agent, or Firm*—Staas & Halsey LLP

(57) ABSTRACT

An electric servo motor is controlled through a pressure control loop wherein a control object is the injection mechanism of an electric injection molding machine. A band elimination filter, which attenuates a frequency component of a band with predetermined width to be determined based on the resonance frequency of the control object, is provided in the pressure control loop.

7 Claims, 8 Drawing Sheets

ELECTRIC INJECTION MOLDING MACHINE

BACKGROUND OF THE INVENTION

1. Field of the Invention

The present invention relates to an electric injection molding machine, and more particularly to an electric injection molding machine which controls pressures, such as injection pressure, molding clamping pressure of a mold clamping mechanism, product knocking-out pressure in an ejector mechanism, by controlling speed of corresponding servo motors.

2. Description of the Related Art

In an injection molding machine, pressure such as injection pressure and back pressure has been generally feedback-controlled. In such pressure control of the injection molding machine, there may be cases where external noises are superimposed on a detection pressure signal to cause instability to the pressure control.

A control method of performing stable control with reduced noise by means of a filter is disclosed in Japanese Patent Application Laid-Open No. 2001-47480 or No. 2001-239564.

On the other hand, in an electric injection molding machine, the driving source of a movable member is an electric motor such as a servo motor. Pressure control of an object that is driven by a servo motor is also performed usually by controlling the speed of the servo motor or a movable member driven by the servo motor. For example, an injection process is controlled using a pressure loop control. The pressure loop control is intended to control the injection pressure, in which a pressure sensor detects resin pressure within a heating cylinder, pressure within a mold, or pressure to be applied to an injection screw by the resin within the heating cylinder; deviation between the actual detection pressure and the set pressure is determined; a speed command is determined based on the deviation; speed loop control is performed such that speed (speed of servo motor or injection screw) detected by a speed detector or the like coincides with the speed command; and finally the pressure loop control is performed such that the detection pressure coincides with the set pressure.

In such a pressure control system having a speed control loop in the pressure control loop in an electric injection molding machine as described above, it has been necessary to make the speed loop gain substantially low such that no oscillation occurs because of a resonance frequency of a control object. As a result, the speed stability during pressure control becomes worse, resulting in such a problem that stably controlled pressure cannot be obtained with an intended manner.

FIGS. 9 and 10 show detection injection pressure waveform and actual speed waveform of a servo motor (screw) which have been measured when injection pressure control is applied to an electric injection molding machine in which the servo motor drives the injection screw in the axial direction to carry out injection. Reference character a denotes set injection pressure; b, detection injection pressure; and c, actual speed of the servo motor. In this respect, this injection pressure control is to perform pressure loop control based on deviation between the set pressure and pressure detected by a pressure sensor for determining a speed command, to perform speed loop control based on speed deviation between the speed command thus obtained and actual speed of the servo motor detected by a speed detector for determining a current command (torque command) to the servo motor, and to drivingly control the servo motor in accordance with the current command obtained.

FIG. 9 shows detection injection pressure waveform b and actual speed waveform c of the servo motor (screw) when the speed loop gain is decreased in order to suppress resonance of the control object. On the other hand, FIG. 10 shows detection injection pressure waveform b and actual speed waveform c of the servo motor (screw) when the speed loop gain is increased.

In case where the speed loop gain is low as shown in FIG. 9, the response is slow at the time when the set pressure a changes, and as regards both the detection injection pressure b and the actual detection speed c, continuously unstable vibration with overshoot and undershoot with a long period occurs.

On the other hand, in case where the speed loop gain is increased as shown in FIG. 10, the response is good, but as regards both the detection injection pressure b and the actual detection speed c, unstable vibrations with a short period occurs.

SUMMARY OF THE INVENTION

It is an object of the present invention to provide an injection molding machine capable of, in a pressure control system having a speed control loop in the pressure control loop, suppressing vibrations and controlling pressure with a high speed loop gain.

In order to achieve the above-described object, there is provided an electric injection molding machine for pressure-controlling a control object by drivingly controlling a servo motor through the use of a pressure control loop according to the present invention, wherein the pressure control loop comprises pressure compensating means for processing deviation between commanded pressure and actual pressure detected by a pressure sensor to output a speed command, and speed compensating means, provided in the rear of the pressure compensating means, for processing deviation between commanded speed and actual speed to output a current command, and a band elimination filter, which attenuates a frequency component of a band with predetermined width to be determined based on resonance frequency of the control object, is provide in the pressure control loop.

As a concrete location whereat this band elimination filter is provided, a location in the rear of the pressure sensor, in the rear of the pressure compensating means, or in the rear of the speed compensating means is selected. Also, the resonance frequency will be determined based on the actual pressure detected, the actual speed detected, or the actual current detected.

Particularly, the present invention is applicable to the case where injection pressure is controlled with an injection mechanism of the injection molding machine being a control object.

DETAILED DESCRIPTION OF THE PREFERRED EMBODIMENTS

Figure 1:
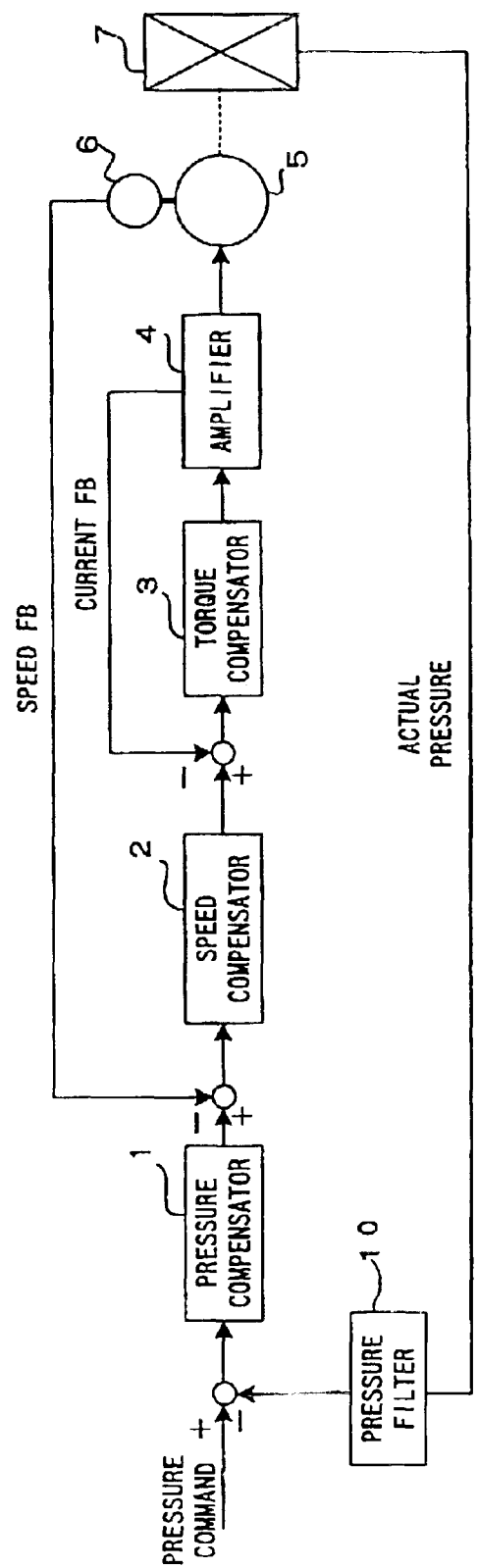
FIG. 1 is a block diagram showing a driving control system for a servo motor for driving an injection mechanism in an electric injection molding machine according to a first embodiment of the present invention.

FIG. 1 is a block diagram showing a driving control system for a servo motor for driving an injection screw in the axial direction to inject resin within a heating cylinder into a mold in an electric injection molding machine according to an embodiment of the present invention. The driving control system of FIG. 1 is different from the conventional control system in that a pressure filter 10 has been provided.

A servo motor 5 is a servo motor for injection, which drives the injection screw in the axial direction through a transmission mechanism such as a timing belt and a motion converting mechanism such as a ball screw/nut to inject molten resin within a heating cylinder into a mold. To the servo motor 5, there is mounted a speed detector 6 such as an encoder. This speed detector 6 detects the servo motor 5 for rotational speed to thereby detect the moving speed of the injection screw for feedback.

Also, a pressure sensor 7 for detecting the resin pressure (injection pressure) by detecting pressure from the resin to be applied to the injection screw is provided in a transmission mechanism between the servo motor 5 and the injection screw. In this respect, the pressure sensor may be provided within the mold or the heating cylinder to directly detect the resin pressure. A detection pressure signal from this pressure sensor 7 is fed back through a pressure filter 10 constructed of a band elimination filter.

In the same manner as heretofore, in a controller for controlling this injection molding machine, a pressure command pattern, which serves as a target of the injection pressure control, has been stored in a memory device (not shown). Thus, a pressure command is read out of the memory device after a predetermined period. From the pressure command thus read out, the detection pressure which was detected by the pressure sensor 7 and for which a frequency component of the predetermined band has been attenuated through the pressure filter 10 is subtracted for determining pressure deviation. A pressure compensator 1 performs processing such as proportion or proportional plus integral control or the like on this pressure deviation obtained for determining the speed command for outputting.

Further, from the speed command, that is output from the pressure compensator 1, actual speed of the servo motor 5 that has been detected and fed back by the speed detector 6 is subtracted to determine the speed deviation. The speed deviation thus determined is subjected to processing such as proportional plus integral control by the speed compensator 2 to determine a current command (torque command) for outputting. Thus, from the current command outputted, a current feedback signal from the detector which detects driving current (not shown) is subtracted to determine current deviation. Then, this current deviation determined is subjected to the processing by the torque compensator 3 to determine a current command to each phase of the servo motor 5, and the servo motor 5 is drivingly controlled through a servo amplifier 4.

The above-described pressure loop control, speed loop control and current loop control of the servo motor 5 are processed by the processor of the controller of the injection molding machine in the same manner as heretofore. Also, for the pressure filter 10 of the FIG. 1, there may be used a pressure filter which is subjected to digital filter processing by the processor of the controller, or a pressure filter to be constructed of a band elimination filter which is connected to the pressure sensor 7, the output of which is A/D converted to be inputted into the processor of the controller.

A frequency band component which is attenuated by the pressure filter 10 constructed of the band elimination filter is a resonance frequency band component of the control object (injection mechanism of the electric injection molding machine). Thus, first the resonance frequency of the injection mechanism will be detected, and based on the resonance frequency thus detected, the frequency band component to be attenuated will be determined.

For this reason, in a state in which the pressure filter 10 has been eliminated in FIG. 1, an output signal from the pressure sensor 7 is fed back (that is, subjected to the conventional pressure control) and pressure commands are given so as to increase in stages for controlling the injection pressure. Thus, by finding such pressure waveform as shown in FIG. 4 through the use of the pressure sensor 7 and Fourier-analyzing the pressure waveform, the resonance frequency can be obtained as shown in FIG. 5.

Figure 4:
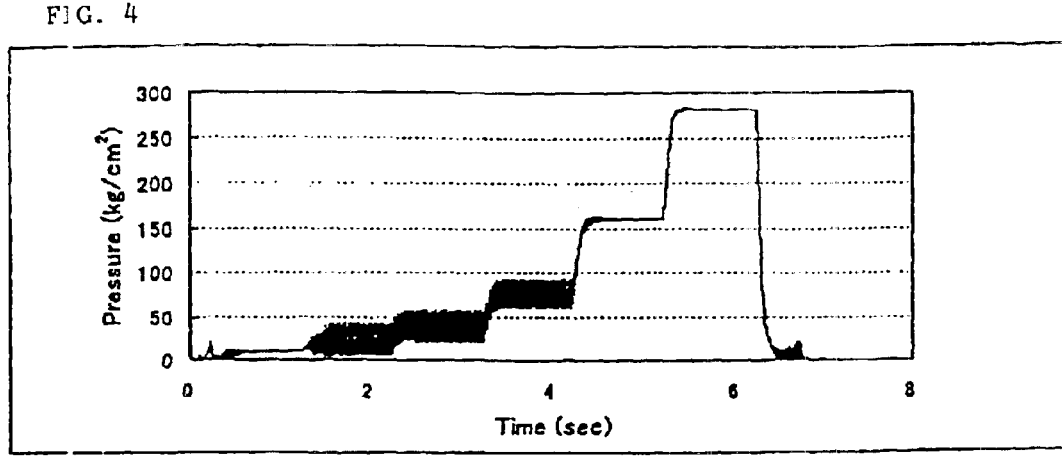
FIG. 4 is a view showing actual pressure waveform measured by giving a pressure command that changes in stages in order to measure a resonance frequency of the control object.
Figure 5:
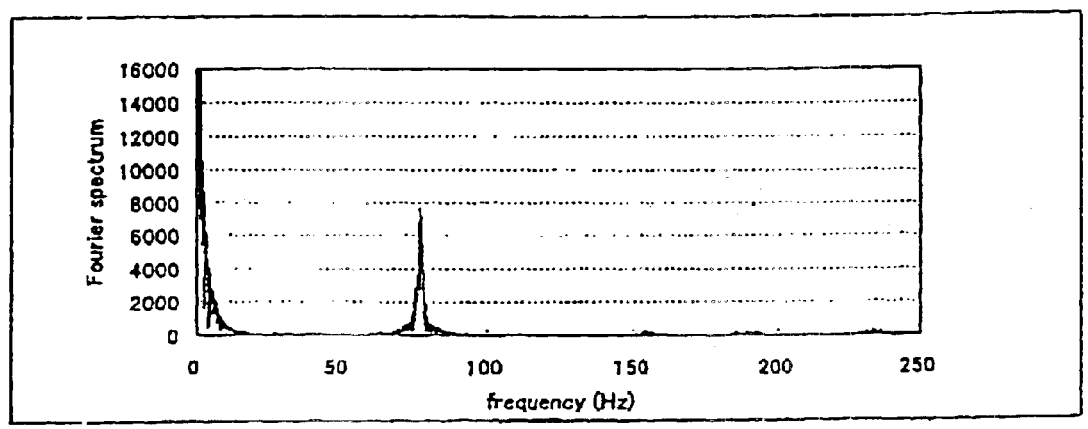
FIG. 5 is a view representing a Fourier spectrum obtained by Fourier-analyzing the pressure wave form measured shown in FIG. 4.

From the pressure waveform of FIG. 4, it can be seen that the detection pressure vibrates within a time period of about 1.5 seconds to 4.3 seconds from the start of injection. FIG. 5 shows a Fourier spectrum obtained by Fourier-analyzing this pressure waveform. From FIG. 5, it can be seen that resonance occurs at about 70 Hz.

Thus, the pressure filter 10 will be constructed of a band elimination filter which attenuates a frequency component (resonance frequency component) of a band having a predetermined width with this 70 Hz being centered.

In this respect, in place of analyzing pressure waveform obtained by detecting the resonance frequency of the control object (injection mechanism) by the pressure sensor 7 as described above for determining, it may be possible to determine the resonance frequency by analyzing (such as Fourier analyzing) speed waveform to be detected by the speed detector 6. Further, it may be also possible to analyze current waveform to be detected by a detector for detecting driving current of the servo motor 5 for determining the resonance frequency.

Figure 6:
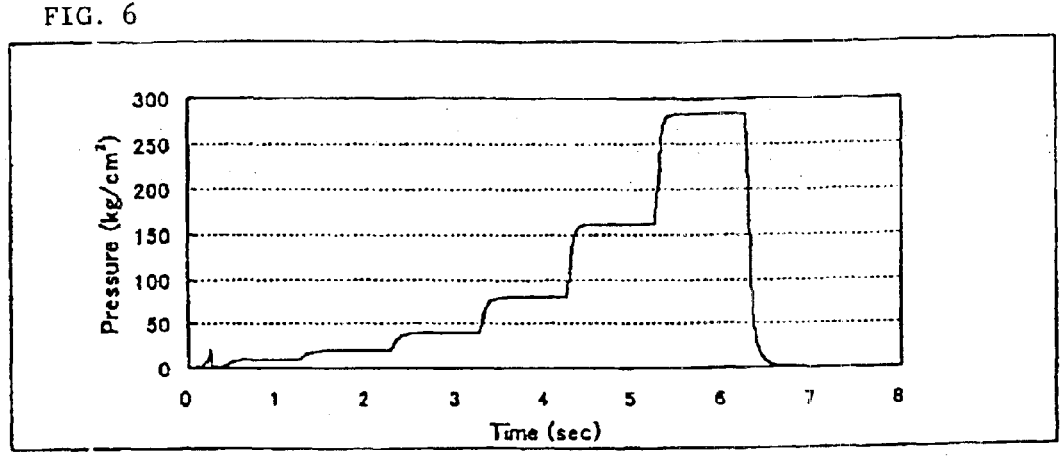
FIG. 6 is a view showing an actual pressure waveform measured by giving, in the electric injection molding machine according to the first embodiment of the present invention, the same pressure command that changes in stages as the example shown in FIG. 4.
Figure 7:
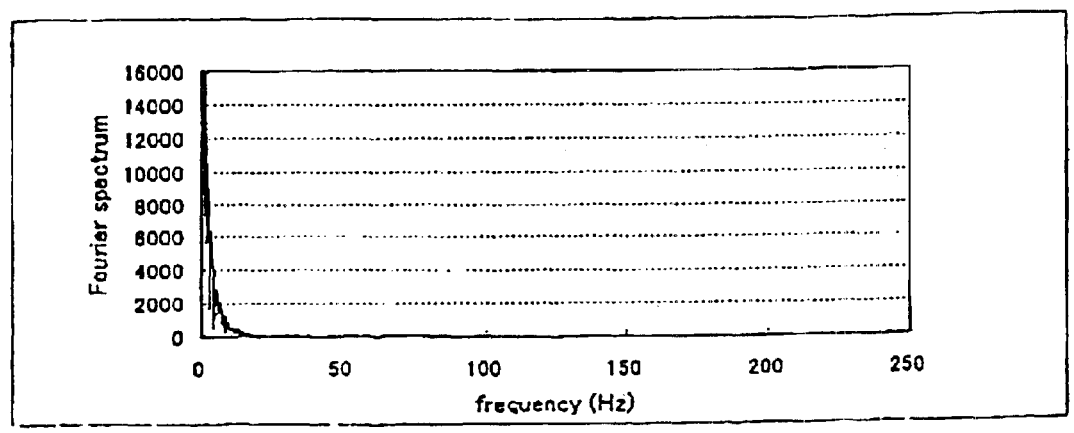
FIG. 7 is a view representing the Fourier spectrum obtained by Fourier-analysis of the actual pressure waveform shown in FIG. 6.

The pressure filter 10 to be constructed of the band elimination filter which attenuates the resonance frequency component determined in this manner will be inserted into a feedback path in the rear of the pressure sensor 7 as shown in FIG. 1. Thus, if the same pressure command which increases in stages as the one which gave the pressure waveform of FIG. 4 is given to measure the output from the pressure sensor 7, such pressure waveform as shown in FIG. 6 is detected. Also, FIG. 7 shows the Fourier spectrum obtained by Fourier-analyzing this pressure waveform. As shown in these FIGS. 6 and 7, there have been no more vibrations of the detection pressure.

Figure 8:
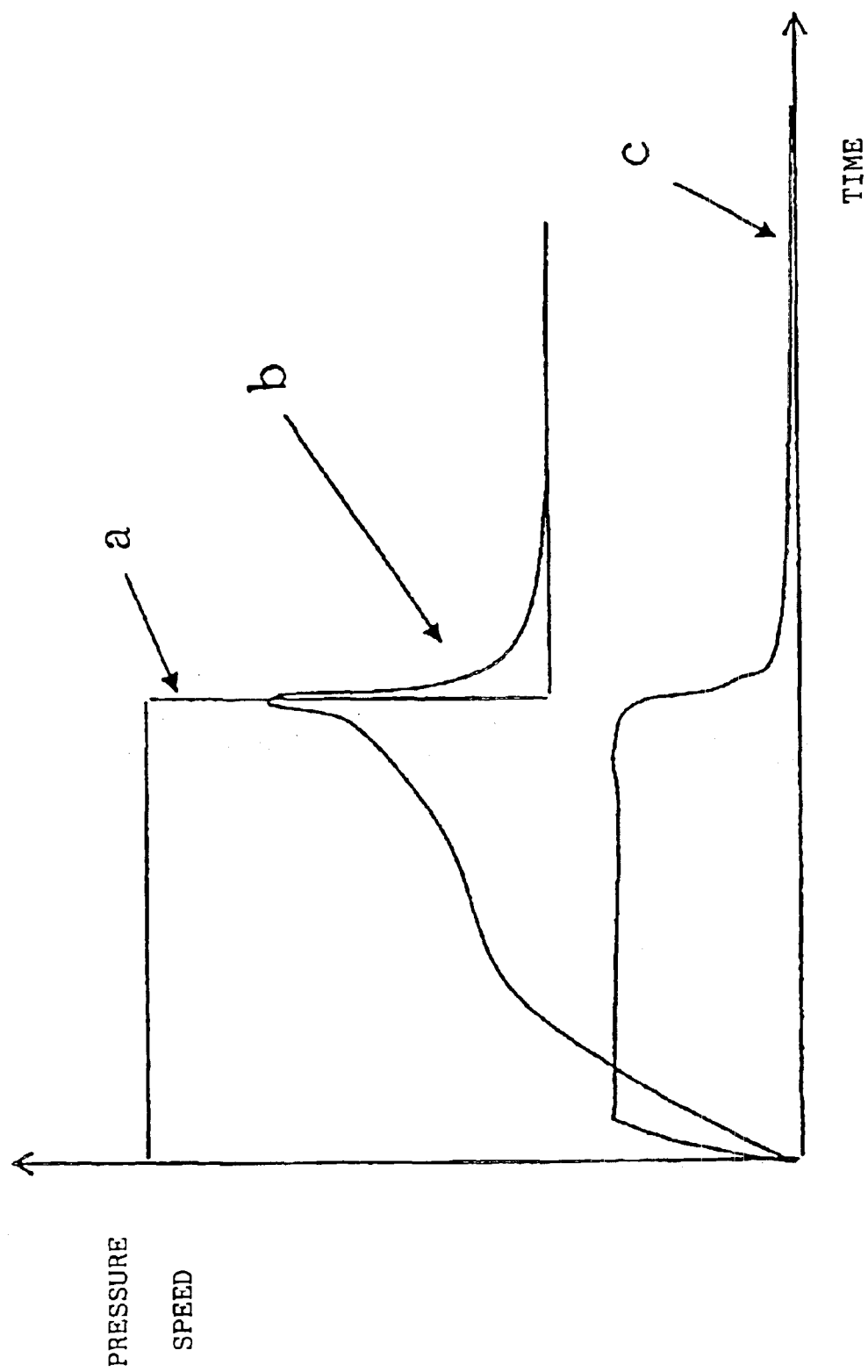
FIG. 8 is a view showing an actual injection pressure waveform and an actual speed waveform of the servo motor in the electric injection molding machine in response to a change in commanded pressure according to the first embodiment of the present invention.
Figure 9:
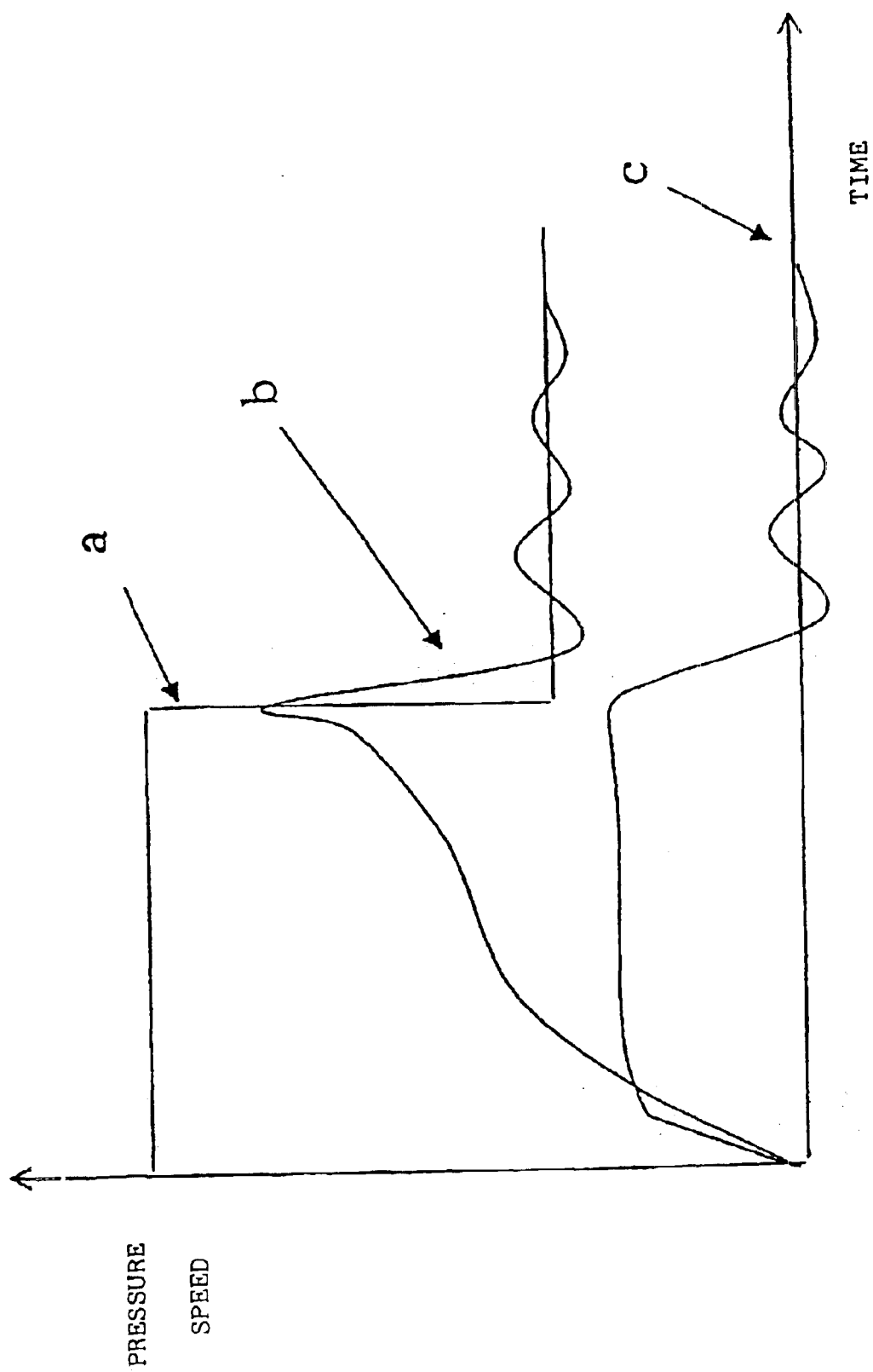
FIG. 9 is a view showing the actual injection pressure waveform and the actual speed waveform of the servo motor when the commanded pressure is changed by decreasing the speed loop gain in a conventional control system.
Figure 10:
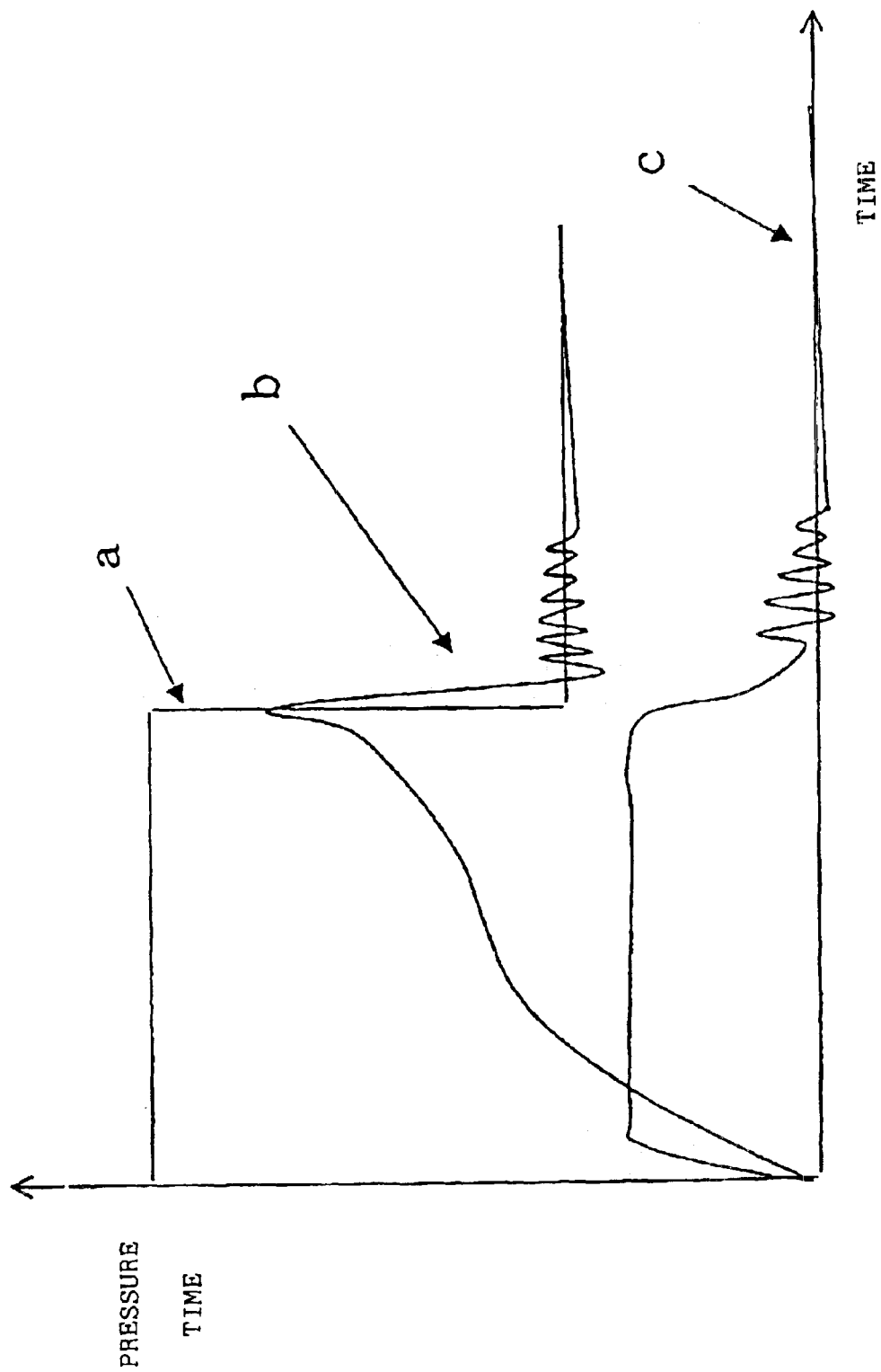
FIG. 10 is a view showing the actual injection pressure waveform and the actual speed waveform of the servo motor when the commanded pressure is changed by increasing the speed loop gain in the conventional control system.

Also, if an injection pressure control is carried out by giving commanded pressure a which changes in stages in the same manner as the examples shown in FIGS. 9 and 10, in a state where the pressure filter 10 which attenuates the resonance frequency component of the control object is provided in the same manner as in FIG. 1 and the speed loop gain (gain of speed compensator 2) is increased, then pressure and speed to be detected by the pressure sensor 7 and the speed detector 6 are shown in the graph of FIG. 8. As seen from the waveform of the actual injection pressure b detected, more responsive pressure control can be performed without causing vibration, following the commanded pressure with stability. Also, similarly, the actual speed c of the servo motor 5 changes with better response without generating vibrations.

Figure 2:
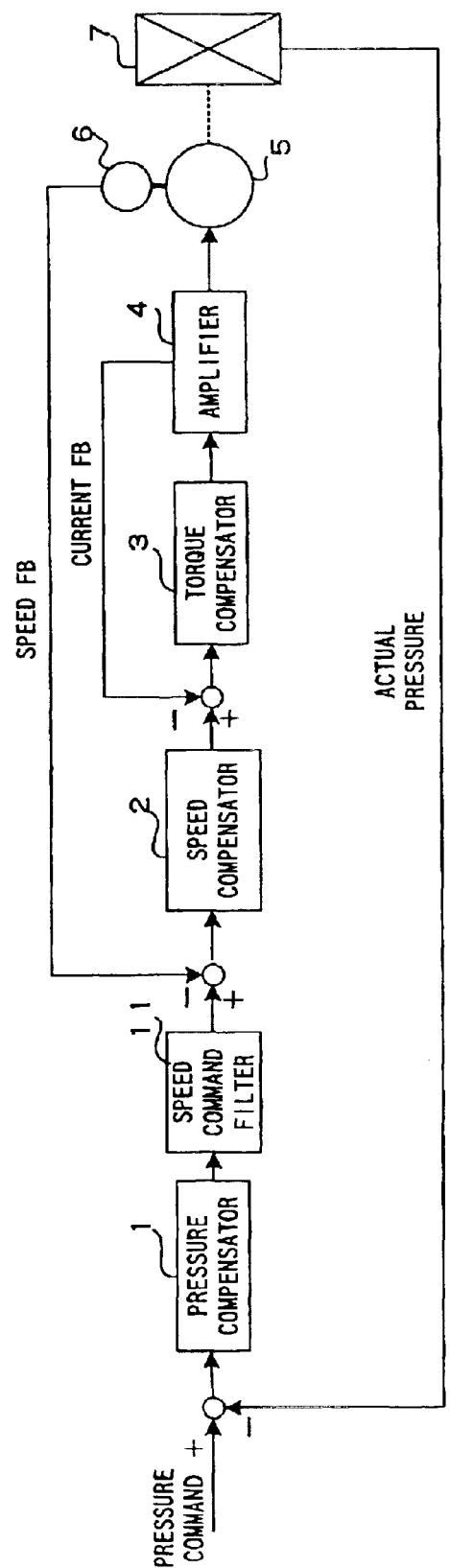
FIG. 2 is a block diagram showing a driving control system for a servo motor for driving an injection mechanism in an electric injection molding machine according to a second embodiment of the present invention.

FIG. 2 is a block diagram showing a motor control system according to the second embodiment of the present invention. The motor control system shown in FIG. 2 is different from the one shown in FIG. 1 in that the pressure filter 10 is eliminated from the feedback path of a detection pressure signal from the pressure sensor 7, and in place thereof, the speed command filter 11 is inserted in the rear of the pressure compensator 1. This speed command filter 11 is also constructed of a band elimination filter which attenuates the frequency component of the resonance frequency band of the control object (injection mechanism) from the speed command.

The detection pressure feedback signal from the pressure sensor 7 is subtracted from the commanded pressure to obtain the pressure deviation, and this pressure deviation is subjected to the processing such as proportion or proportional plus integral control by the pressure compensator 1 for determining the speed command. This speed command is then filtered by the speed command filter to attenuate the frequency component (resonance frequency component) of the set band for obtaining a speed command to the speed loop processing. The subsequent processing is the same as the one explained in FIG. 1.

In the second embodiment shown in FIG. 2, the speed loop control and the current loop control are performed with the resonance frequency component attenuated from the speed command, too. In other words, control is performed in the control system as a whole with the resonance frequency component attenuated. With this control system, as in the case of the embodiment shown in FIG. 1, the speed loop gain can be increased, and more responsive pressure control can be performed without causing any vibration.

Figure 3:
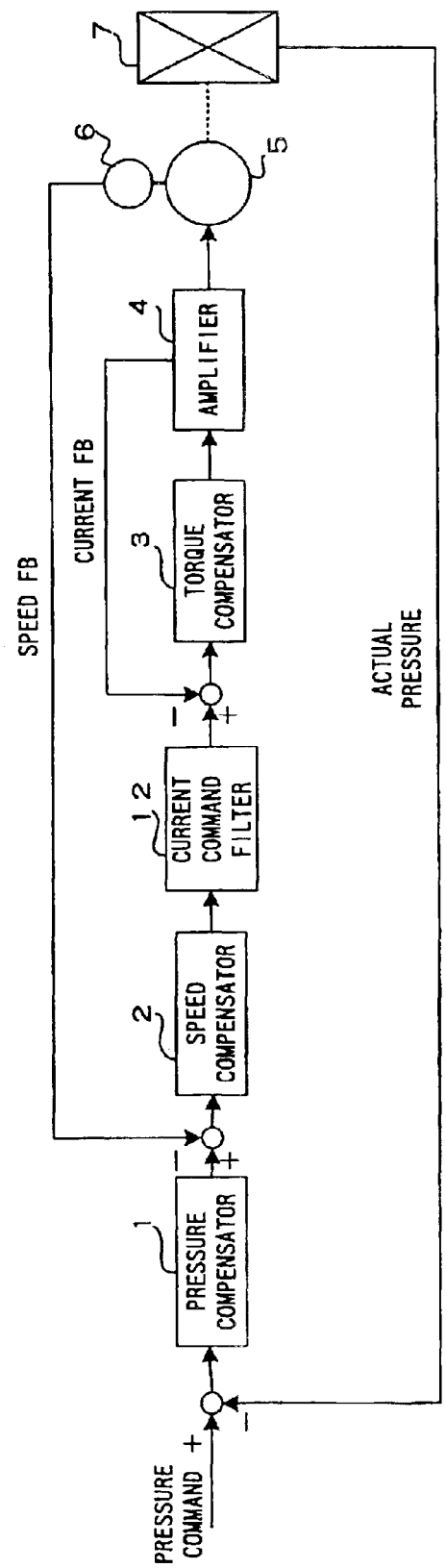
FIG. 3 is a block diagram showing a driving control system for a servo motor for driving an injection mechanism in an electric injection molding machine according to a third embodiment of the present invention.

FIG. 3 is a block diagram showing a motor control system according to the third embodiment of the present invention.

The control system shown in FIG. 3 is different from the first and second embodiments shown in FIGS. 1 and 2 in that a current command filter 12 is inserted in the rear of the speed compensator, in place of the pressure filter 10 and the speed command filter 11. This current command filter 12 is also constructed of a band elimination filter which attenuates the frequency component of the resonance frequency band of the control object (injection mechanism) from the current command.

The detection pressure feedback signal from the pressure sensor 7 is subtracted from the commanded pressure to obtain the pressure deviation, and this pressure deviation is subjected to the processing such as proportion or proportional plus integral control by the pressure compensator 1 for determining a speed command. From the speed command, the actual speed of the servo motor 5 that is detected and is fed back by the speed detector 6 is subtracted to determine the speed deviation. The speed deviation is then processed by the speed compensator for determining the current command. This current command is filtered by the current command filter 12 to attenuate the frequency component (resonance frequency component) of the set band for obtaining a current command to the current loop processing. The subsequent processing is the same as the processing explained in FIG. 1.

In the case of the third embodiment, no resonance occurs since the resonance frequency component is attenuated from the current command, so that more responsive pressure control can be performed with stability using a higher speed loop gain.

In each of the embodiments described above, control of an injection pressure is performed as an example of a pressure control according to the present invention, but the present invention can also be applied to other pressure controls. In other words, the present invention can be applied to a case where the control object is a mold clamping mechanism and a mold clamping force is pressure-controlled or the control object is a product knocking-out mechanism (ejector mechanism) and pressure control is applied to knocking the product out of the mold. In such pressure controls, a speed loop control is contained in a pressure loop control system such that the deviation between a commanded pressure and a detection pressure is obtained and a pressure loop control is performed based on the obtained deviation for obtaining a speed command, and then speed loop control is performed based on the obtained speed command.

As described above, according to the present invention, since no vibration is caused even though the speed loop gain is increased to perform the pressure control, it is possible to perform more responsive, stable pressure control.

What is claimed is:

1. An electric injection molding machine for pressure-controlling a control object of said injection molding machine by drivingly controlling a servo motor through the use of a pressure control loop, said pressure control loop comprising:

pressure compensating means for processing a deviation between commanded injection pressure and actual injection pressure detected by a pressure sensor to output a speed command to a speed compensating means; and said speed compensating means, provided in the rear of said pressure compensating means, for processing a deviation between commanded speed and actual speed of said servo motor to output a torque command to a torque compensator, wherein a band elimination filter, which attenuates a frequency component of a band with a predetermined width to be determined based on a resonance frequency of said control object, is provided in said pressure control loop wherein said control object is selected from the group consisting of an injection mechanism, an ejector mechanism, and a mold clamping mechanism.

2. The electric injection molding machine according to claim 1, wherein said band elimination filter is provided in the rear of said pressure sensor.

3. The electric injection molding machine according to claim 1, wherein said band elimination filter is provided in the rear of said pressure compensating means.

4. The electric injection molding machine according to claim 1, wherein said band elimination filter is provided in the rear of said speed compensating means.

5. The electric injection molding machine according to claim 1, wherein said resonance frequency is determined based on actual pressure detected.

6. The electric injection molding machine according to claim 1, wherein said resonance frequency is determined based on actual speed detected.

7. The electric injection molding machine according to claim 1, wherein said resonance frequency is determined based on actual current detected.

* * * * *